United States Patent [19]

Hilgren

[11] Patent Number: 5,091,081
[45] Date of Patent: Feb. 25, 1992

[54] ANTI-FREEZE RECYCLING APPARATUS AND METHOD

[75] Inventor: Wallace L. Hilgren, Edina, Minn.

[73] Assignee: Kleer-Flo Company, Minneapolis, Minn.

[21] Appl. No.: 510,531

[22] Filed: Apr. 18, 1990

[51] Int. Cl.⁵ .............................................. B01D 37/02
[52] U.S. Cl. ........................... 210/195.2; 210/195.3; 210/295; 210/296; 210/323.1; 206/569
[58] Field of Search ............... 210/650, 651, 295, 805, 210/767, 257, 96.1, 101, 167, 195.2, 103, 758, 195.3, 296, 323.1; 206/569

[56] References Cited

U.S. PATENT DOCUMENTS

| | | | |
|---|---|---|---|
| 4,528,093 | 9/1985 | Winer | 210/96.2 |
| 4,692,251 | 9/1987 | Hilgren | 210/651 |
| 4,895,649 | 1/1990 | Brandt et al. | 210/195.2 |
| 4,946,596 | 8/1990 | Miller, Jr. | 210/767 |
| 4,966,693 | 10/1990 | Brandt et al. | 210/195.2 |

*Primary Examiner*—Robert A. Dawson
*Assistant Examiner*—Ana Fortuna
*Attorney, Agent, or Firm*—Merchant, Gould, Smith, Edell, Welter & Schmidt

[57] ABSTRACT

A method and apparatus are disclosed for cleansing a used automobobile anti-freeze solution. The method and apparatus include pre-filtering a used solution with a particulate filter selected to filter contaminant sized greater than a predetermined minimum size. An ultrafiltration membrane filter is provided. The ultrafiltration filter has a semi-permeable membrane separating a concentrate portion from a permeate portion. The pre-filtered solution is passed to the concentrate portion and the permeate portion is connected to a storage tank. Additives are provided for replenishing filtered constituents.

4 Claims, 2 Drawing Sheets

ANTI-FREEZE RECYCLING APPARATUS AND METHOD

BACKGROUND OF THE INVENTION

1. Field of the Invention.

This invention pertains to an apparatus and method for recycling automotive anti-freeze. More particularly, this invention pertains to such an apparatus and method for cleansing a contaminated anti-freeze of extremely small contaminants and replenishing the used anti-freeze.

2. Description of the Prior Art.

From time to time, it is necessary for an automobile owner to flush a coolant system and replace used anti-freeze (the term "antifreeze" referring to concentrated anti-freeze diluted with water). With the vast number of automobiles being serviced each year, significant problems are presented. For example, the environmental impact of disposal of used anti-freeze is substantial. Specifically, ethylene glycol, a principal ingredient of anti-freeze, may have deleterious environmental effects. Accordingly, many localities will not permit ethylene glycol to be poured into municipal sewer systems. In addition to the adverse environmental impact, there is a substantial economic impact resulting from disposal of vast quantities of anti-freeze.

It is an object of the present invention to provide a method and apparatus for recycling used automobile anti-freeze.

SUMMARY OF THE INVENTION

According to a preferred embodiment of the present invention, a method and apparatus are disclosed for cleansing used automobile anti-freeze solution. The method and apparatus include pre-filtering the used solution in a particulate filter selected to filter away larger contaminants. The pre-filtered solution is passed through a semi-permeable membrane filter. The permeate from the semi-permeable membrane filter is passed to a storage container where an additive is mixed with the filtered solution to replenish desired constituents.

DESCRIPTION OF THE PREFERRED EMBODIMENT

Figure 1:
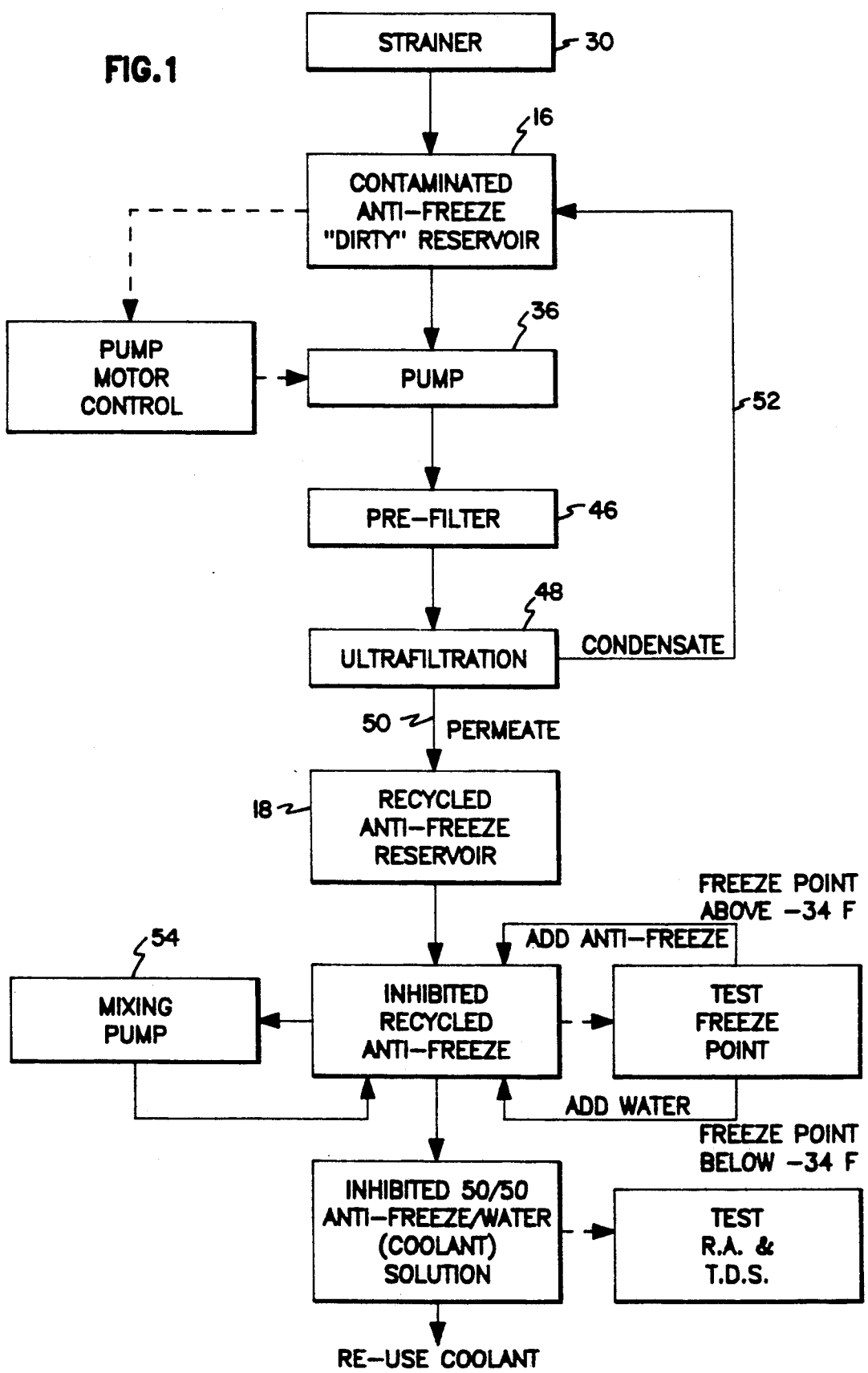
FIG. 1 is a schematic representation of the apparatus of the present invention showing the method steps in the present invention.

Referring to the drawing figures in which identical elements are numbered identically throughout, the apparatus of the present invention is shown. The apparatus 10 includes a housing 12 which rests on support legs 14.

Internal walls of the housing 12 divide the housing 12 into a plurality of compartments including a used anti-freeze solution holding tank 16 and a recycled anti-freeze solution storage tank 18. The internal walls also define a mechanical equipment interior 20 to house plumbing and filtration equipment as will be described.

A first lid 22 (shown partially in section) is provided covering holding tank 16. A second lid 24 (shown partially in section) is provided covering storage tank 18. A front access door 26 (shown exploded from apparatus 10) is provided for removably covering interior 20. Door 26 has a latching handle 28 which an operator engages to open or close door 26.

Figure 2:
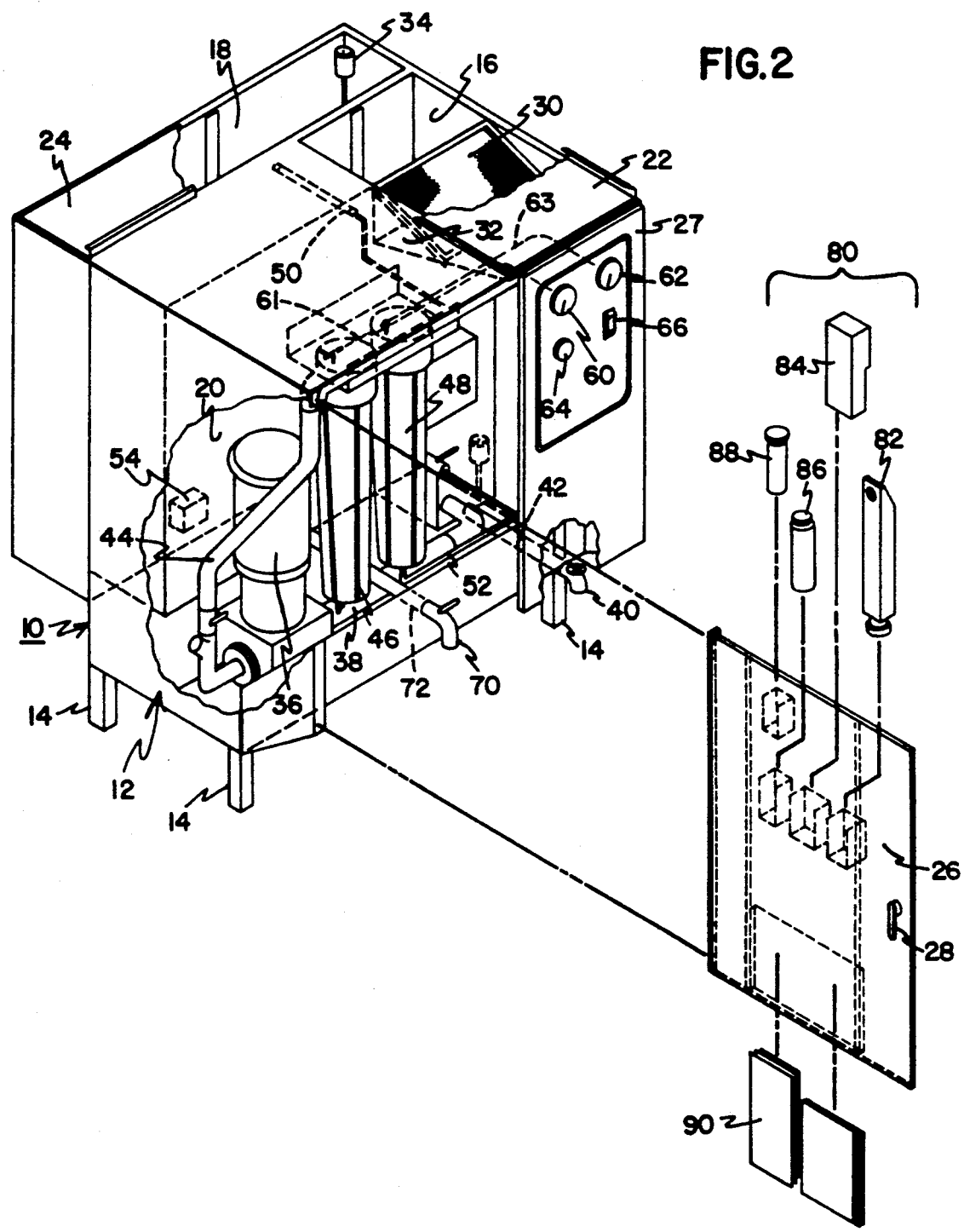
FIG. 2 is a perspective view, shown partially exposed, of an anti-freeze recycling apparatus according to the present invention.

As shown in FIG. 2, the top of holding tank 16 is provided with a particulate screen or strainer 30 disposed above a splash plate 32 with splash plate 32 inclined to direct liquid flow into holding tank 16. Accordingly, used anti-freeze solution drained from an automobile coolant system may be poured through screen 30 into tank 16. Screen 30 will remove large particulate material.

A float (not shown) is provided within tank 18 connected to an indicator (not shown) for indicating a level of recycled anti-freeze within tank 18. A shut-off valve 34 automatically shuts off the apparatus 10 when tank 18 is full. Similarly, a shut-off valve may be added to tank 16 to shut off the apparatus when tank 16 is empty.

The internal plumbing and filtering system of the apparatus 10 includes a pump 36 connected through a main intake conduit 38 to the bottom of tank 16. A drain valve 40 is also connected via a conduit 42 to the bottom of tank 16. An output side of pump 36 is connected via conduit 44 to the intake of a pre-filter 46.

The output of the pre-filter 46 is connected to the input of an ultrafiltration filter 48. The ultrafiltration filter is a commercially available filter having a semi-permeable membrane separating the filter between a condensate side and a permeate side. The membrane is semi-permeable and includes a plurality of extremely small pores of controlled size. The membrane is selected such that the pores are sufficiently small to pass molecules of the solution but restrict molecules of selected contaminants and other particles which contaminate the anti-freeze. By admitting used, pre-filtered anti-freeze solution under pressure to the inlet of the condensate side of the ultrafiltration filter 48, the molecules of the anti-freeze pass through the pores and may be drawn off of the permeate side of the ultrafiltration filter 48. The molecules of the contaminants are drawn off of an outlet 52 of the condensate side of the ultrafiltration filter 48.

It will be appreciated that ultrafiltration filters having semi-permeable membranes separating a condensate side from a permeate side are well known in the art. An example of such is shown schematically in U.S. Pat. No. 4,692,251 (which is incorporated herein by reference). That patent teaches the use of an ultrafiltration filter to filter off contaminants from a hydrocarbon solvent.

The outlet of the permeate side of the ultrafiltration filter 48 is connected via a conduit 50 to the top of the storage tank 18. The outlet of the condensate side of the ultrafiltration filter 48 is connected via a conduit 52 to the holding tank 16. As a result, the condensate may be recirculated.

The apparatus 10 also includes a mixing pump 54 (shown schematically in FIG. 2) for mixing liquids within the tank 18. A front panel 27 of the housing 12 carries pressure gauges 60 and 62. Pressure gauge 60 indicates, via a conductor 61, the pressure at the inlet of the pre-filter 46. Pressure gauge 62 displays, via conductor 63 the pressure at the inlet to the ultrafiltration filter 48. A start switch 64 is provided for starting pump 36. A second switch 66 is provided for operating mixing pump 54.

A drain spout 70 connected via a conduit 72 is connected to the bottom of storage tank 18 for drawing recycled solution from tank 18.

It will be appreciated that during use in an automobile, an anti-freeze solution becomes contaminated with a plurality of contaminating material. For example, particulate solids (which may be the residual of gasket material) may become suspended within the solution. Also, silica, an ingredient of anti-freeze, may form a colloid. Also, heavy metals (such as lead from solder in the automobile's coolant system) may contaminate the solution.

The filters 46 and 48 are selected to filter the undesirable contaminants. Filter 46 is selected to filter large particulate matter which might otherwise damage or clog the ultrafiltration filter 48. The ultrafiltration system 48 is selected to filter out at the molecular level coagulated silica and heavy metal material. In a preferred embodiment, ultrafiltration filter 48 will filter out contaminants having a size greater than 25 angstroms (50 angstroms being necessary to remove colloidal silica). The pre-filter 46 will filter out contaminants having a size greater than 5 microns.

The filtration system may filter out the desirable constituents. Also, the colloidal silica should be replaced with dissolved silica in a form sufficient to add protection to the anti-freeze. Accordingly, it has been determined to be necessary to add an additive to tank 18. The preferred additive is a mixture of the following constituents:

| Additive Ingredient | Percentage by Weight |
|---|---|
| Ethylene glycol | 20-25 |
| Potassium Hydroxide | 3-5 |
| sodium nitrate | 2-4 |
| sodium silicate | 2-4 |
| potassium phosphate | 4-6 |
| corrosion inhibitors (including tolyltriazole for yellow metal protection) | 0.5-1.5 |
| Water | 60-70 |

It has been determined that the addition of the above additive will replace and replenish desirable constituents filtered from the solution or constituents that may be consumed during the life of the antifreeze in the automobile coolant system. It has been determined that the addition of one gallon of additive to twenty-five gallons of recycled anti-freeze in tank 18 is an adequate mixture. With the additive in tank 18, mixing pump 54 is turned on by switch 66.

With the additive added to the recycled anti-freeze, it still must be determined that the recycled and replenished solution is adequate for use in an automobile coolant system. Accordingly, a test kit 80 is provided carried on the inside surface of access door 26. The test kit 80 includes a hand-held refractometer 82, a conductivity meter 84, a conductivity meter calibrant solution 86 and reserve alkalinity test kit 88. Also, for ease of operation, the inside surface of access door 26 contains instruction manuals 90 and the like for use by an operator.

Refractometer 82 is provided to test the freeze point of the solution in tank 18 after the addition of the additive. Such products are commercially available and an example of such is the Duo-Check product of MISCO ™ Products Division, Cambridge Instruments Inc., Cleveland, Ohio. With the freeze point determined, the operator can compare the freeze point to a desired freeze point of −34° F.

If the freeze point as measured by the refractometer 82 is below the desired freeze point, water can be added to dilute the solution in tank 18. The amount of water to be added will vary in response to the difference between the measured or test freeze point and the desired freeze point. If the measured freeze point is greater than −34°, additional concentrated anti-freeze (with a high ethylene glycol concentration) can be added to the solution in tank 18. It will be appreciated that the amount of water to be added or concentrated anti-freeze to be added to bring the freeze point to the desired freeze point would be within the skill of the art and could be the result of trial and error. However, to assist an operator, it is preferred that one of the instruction sheets 90 will include a chart indicating the amount of water or concentrated anti-freeze to be added to tank 18 in response to a measured freeze point.

The conductivity meter 84 is utilized to test for an indication of the total dissolved solids within the anti-freeze in tank 18 after the desired freeze point has been attained. Again, it will be appreciated that conductivity meters such as meter 84 are commercially available items. An example of such is Model HJ105 of the Morr Control, Inc., Muskogee, Okla. The conductivity meter 84 compares the conductivity of the solution in tank 18 (which has been brought to the desired freeze point through use of tester 82) to the conductivity of a known solution contained in jar 86.

If the detected conductivity is too high, the solution may simply be diluted with a mixture of concentrated anti-freeze and water until a desired conductivity is attained.

Finally, test kit 88 is a litmus test for reserve alkalinity. If reserve alkalinity is too low, the mixture can simply be diluted with concentrated anti-freeze and water. It will be appreciated that litmus test kits for testing reserve alkalinity are commercially available items. An example of such is the RADI-AIDER ® kit made available through the Environmental Test Systems Inc. of Elkhart, Ind. with a product bearing U.S. Pat. No. 3,973,909.

With the used anti-freeze solution filtered, replenished with an additive, and tested for freeze point, reserve alkalinity and dissolved solids, the recycled solution may now be again used in an automobile cooling system.

The above procedures using test kits 80 and the addition of the additive as described are for use with automobile engines other than heavy duty diesels with wet sleeve liners. For use with heavy duty diesels having wet sleeve liners, the apparatus 10 is first utilized to recycle spent coolant. Next, the freeze point is checked and adjusted using the hand-held refractometer 82 as previously described.

Following the freeze point adjustment, a nitrite level of the coolant is tested using a nitrite coolant test kit (not shown). Such test kits are commercially available. An example of such is a nitrite titration coolant test set marketed by the Dearborn Chemical Division of W. R. Grace & Company, Lake Zurich, Ill. for use with their product End Cor ® Product No. 4718. The nitrite titration test kit tests for nitrite levels by adding drops of a solution to the coolant. In response to the number of drops added as part of the test, the End Cor ® product is added as an additive and corrosion inhibitor. The End Cor ® product is a corrosion inhibitor adding nitrite to the antifreeze solution. The amount of End Cor ® product added is determined by the following:

| Drops of Solution Utilized in the Nitrite Titration Test | Action Required |
| --- | --- |
| 0-12 | Add one gallon of End Cor ® solution to each 25 gallons of recycled coolant. |
| 13-17 | Add one-half gallon of End Cor ® to each 25 gallons of recycled coolant. |
| 18-25 | Do not add any End Cor ® solution to the recycled coolant. |
| 26-33 | Drain half of the recycled coolant and refill tank 18 with a fresh mixture of concentrated antifreeze and water and add one-quarter gallon of End Cor ® solution to each 25 gallons in tank 18. |
| over 34 drops | Drain half of the recycled coolant and refill tank 18 with a fresh mixture of concentrated antifreeze and water. Do not add any End Cor ® solution. |

After completing the steps above, the reserve alkalinity of the solution is then tested with kit 88.

In the foregoing detailed description of the present invention, it has been shown how the objects of the invention have been achieved in the preferred manner. However, modifications and equivalents of the disclosed concepts, such as those which will readily occur to one skilled in the art, are intended to be included with the scope of the invention and the scope of the claims appended hereto.

What is claimed is:

1. An apparatus for cleansing a used automobile antifreeze solution, said apparatus comprising the following:

a holding tank for holding used automobile antifreeze solution;

a pre-filter for receiving solution from said holding tank and pre-filtering said solution of contaminants sized greater than a predetermined minimum size;

a membrane filter connected to said pre-filter and having a semi-permeable membrane with a concentrate portion disposed on one side of said membrane and a permeate portion disposed on an opposite side of said membrane, said concentrate portion connected to receive pre-filtered solution from said pre-filter; and a test kit for testing desired parameters of said solution.

2. An apparatus according to claim 1 wherein said test kit includes a refractometer for testing a freeze point of said solution.

3. An apparatus according to claim 1 wherein said test kit includes a conductivity meter for detecting a total dissolved solids content of said solution.

4. An apparatus according to claim 1 wherein said test kit includes means for testing a reserve alkalinity of said solution.

* * * * *